United States Patent
Wada (10) Patent No.: US 7,702,165 B2
(45) Date of Patent: Apr. 20, 2010

(54) DEVICE, METHOD, AND PROGRAM FOR IMAGE CODING

(75) Inventor: Takahisa Wada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 875 days.

(21) Appl. No.: 11/535,668

(22) Filed: Sep. 27, 2006

(65) Prior Publication Data

US 2007/0081735 A1  Apr. 12, 2007

(30) Foreign Application Priority Data

Oct. 6, 2005  (JP) ............................. 2005-293716

(51) Int. Cl.
*G06K 9/36* (2006.01)
*G06K 9/40* (2006.01)
*H04B 1/66* (2006.01)

(52) U.S. Cl. ........................ 382/232; 382/268; 375/240

(58) Field of Classification Search ......... 382/232–254, 382/260, 266, 268; 358/426.01–426.16; 375/240, 240.03; 348/240.1–241.1
See application file for complete search history.

(56) References Cited

U.S. PATENT DOCUMENTS

| | | | | | |
|---|---|---|---|---|---|
| 5,196,933 | A | * | 3/1993 | Henot | 375/240.05 |
| 5,237,410 | A | * | 8/1993 | Inoue | 375/240.12 |
| 5,367,385 | A | * | 11/1994 | Yuan | 358/465 |
| 5,416,604 | A | * | 5/1995 | Park | 382/232 |
| 5,452,104 | A | * | 9/1995 | Lee | 358/426.14 |
| 5,479,211 | A | * | 12/1995 | Fukuda | 375/240.03 |
| 5,590,064 | A | * | 12/1996 | Astle | 708/203 |
| 5,625,714 | A | * | 4/1997 | Fukuda | 382/233 |
| 5,754,699 | A | * | 5/1998 | Sugahara | 382/233 |
| 5,790,265 | A | * | 8/1998 | Shikakura | 358/426.09 |
| 5,805,302 | A | * | 9/1998 | Enari et al. | 358/426.12 |
| 5,847,840 | A | * | 12/1998 | Enari | 358/409 |
| 6,167,157 | A | * | 12/2000 | Sugahara | 382/236 |
| 6,249,546 | B1 | * | 6/2001 | Bist | 375/240.03 |
| 6,625,323 | B2 | * | 9/2003 | Henderson et al. | 382/251 |
| 2006/0078208 | A1 | * | 4/2006 | Malvar | 382/232 |
| 2006/0126731 | A1 | * | 6/2006 | Kim et al. | 375/240.03 |

FOREIGN PATENT DOCUMENTS

| | | |
|---|---|---|
| JP | 5-328329 | 12/1993 |
| JP | 8-130735 | 5/1996 |
| JP | 2001-268580 | 9/2001 |

* cited by examiner

*Primary Examiner*—Manav Seth
(74) *Attorney, Agent, or Firm*—Oblon, Spivak, McClelland, Maier & Neustadt, L.L.P.

(57) ABSTRACT

There is provided with an image coding method including: splitting an image into a plurality of block images each having plural pixels; performing a Discrete Cosine Transform (DCT) processing on the block image to calculate DCT coefficients from the block image; determining whether the block image is in a flat state or non-flat state depending on the DCT coefficients calculated from the block image; specifying as quantization step sizes for first DCT coefficients which are DCT coefficients equivalent to one-dimensional DCT coefficient out of the calculated DCT coefficients, adjusting step sizes equal to or smaller than values of the first DCT coefficients and as quantization step sizes for second DCT coefficients other than the first DCT coefficients out of the calculated DCT coefficients, standard step sizes given beforehand, when the block image is in the flat state; and quantizing the calculated DCT coefficients with respective quantization step sizes specified.

19 Claims, 9 Drawing Sheets

X DIRECTION →

Y DIRECTION ↓

| $M_{00}$ | $M_{01}$ | $M_{02}$ | $M_{03}$ | $M_{04}$ | $M_{05}$ | $M_{06}$ | $M_{07}$ |
|---|---|---|---|---|---|---|---|
| $M_{10}$ | $M_{11}$ | $M_{12}$ | $M_{13}$ | $M_{14}$ | $M_{15}$ | $M_{16}$ | $M_{17}$ |
| $M_{20}$ | $M_{21}$ | $M_{22}$ | $M_{23}$ | $M_{24}$ | $M_{25}$ | $M_{26}$ | $M_{27}$ |
| $M_{30}$ | $M_{31}$ | $M_{32}$ | $M_{33}$ | $M_{34}$ | $M_{35}$ | $M_{36}$ | $M_{37}$ |
| $M_{40}$ | $M_{41}$ | $M_{42}$ | $M_{43}$ | $M_{44}$ | $M_{45}$ | $M_{46}$ | $M_{07}$ |
| $M_{50}$ | $M_{51}$ | $M_{52}$ | $M_{53}$ | $M_{54}$ | $M_{55}$ | $M_{56}$ | $M_{57}$ |
| $M_{60}$ | $M_{61}$ | $M_{62}$ | $M_{63}$ | $M_{64}$ | $M_{65}$ | $M_{66}$ | $M_{67}$ |
| $M_{70}$ | $M_{71}$ | $M_{72}$ | $M_{73}$ | $M_{74}$ | $M_{75}$ | $M_{76}$ | $M_{77}$ |

DEVICE, METHOD, AND PROGRAM FOR IMAGE CODING

CROSS-REFERENCE TO RELATED APPLICATIONS

This application is based upon and claims the benefit of priority from the prior Japanese Patent Applications No. 2005-293716 filed on Oct. 6, 2005, the entire contents of which are incorporated herein by reference.

BACKGROUND OF THE INVENTION

1. Field of the Invention

The present invention relates to an image coding device, method and program to compress moving images.

2. Related Art

Conventionally, block coding such as block DCT (Discrete Cosine Transform) coding has been known as a coding method to efficiently compress still image data, moving image data and the like.

When image data is compressed or decompressed by such block coding, block distortion may occur. The higher a compression rate is, the more likely the distortion occurs. Since the DCT coding and the like makes conversion in a closed space in a block without considering correlation between blocks across a block boundary, block continuity cannot be retained at the boundary. Thus, the difference of a restored data value at the boundary with an adjacent block is recognized as the block distortion. Additionally, if high-frequency components are removed to raise a compression rate, the continuity cannot be retained at the boundary with the adjacent block, causing the distortion. The block distortion, which occurs when the block coding is performed on image data, is more easily to be recognized than usual random noises because it has a kind of regularity. And it is a main cause of image quality degradation.

To reduce this block distortion, for example, a document of "A denoising filter in an MC-DCT coding method", Ida and Dachiku, IEICE (The Institute of Electronics, Information and Communication Engineers) 1990 Shunki Zenkoku Taikai Koen Ronbun-shu (in Japanese) (Spring National Convention Lectures Transactions) 7-35 discloses a technique of using a quantization step size to decide filter ON/OFF, or executing a multiple courses of processing by changing a processing direction to retain edges and perform denoising. Although in this method it is easy to perform the processing, there is a disadvantage that the image's high-frequency components are lost and resolution is degraded.

Additionally, a document of "Characteristics of adapted denoising filters in image block coding", Izawa, Kiyo (in Japanese) (Annals) No. 74, pp. 89-100, Faculty of Engineering, Shinshu University discloses a technique of performing the DCT even on surrounding blocks and removing noise frequency components. Although this method effectively reduces block distortion while maintaining resolution, the processing is complex and expensive, so it is unsuitable to apply to some devices, especially consumer devices.

While the above methods are techniques used in decoding images, many other techniques have been proposed. However, with reducing the block distortion at the decoding, erroneous determination of the block distortion or pseudo-edges of the blocks can occur. To resolve this problem, as a method to make the block distortion as unremarkable as possible at the encoding, the Japanese Patent Laid-Open No. 8-130735 proposes a method for specifying a different reference coordinates position for block splitting for each frame to shift the block distortion for each frame to make the distortion unremarkable. In this method, however, since encoding and decoding are a pair in an algorithm, the opportunity to apply the algorithm is significantly limited.

Additionally, the Japanese Patent Laid-Open No. 2001-268580 proposes a method for using motion vectors to encode parts remarkable in motion with high-frequency components reduced to raise the compression rate, and encode parts unremarkable in motion without highly reducing high-frequency components to retain resolution. This method, however, has a problem that since it assumes that the motion vectors are correctly detected, image quality drops if the motion vectors are falsely detected.

Incidentally, one example of block coding methods for image data may include the MPEG (Moving pictures Experts Group) scheme in which the DCT using correlation inside an image, motion compensation using correlation between images, and the Huffman coding using correlation between code strings are combined.

The MPEG scheme accomplishes the compression by reducing high frequency components of space frequency of image data by weighting quantization. Thus, there is a problem that if raising the compression rate is attempted, the high frequency components are removed accordingly and block distortion occurs. Additionally, if high frequency components are sufficiently reduced when image data is input, high frequency components removed afterward by the quantization decrease and the distortion due to the compression reduces. If, however, too many high frequency components are lost at the input, a restored image looses sharpness, making a blurred image. This seriously affects, especially, images unremarkable in motion.

SUMMARY OF THE INVENTION

According to an aspect of the present invention, there is provided with an image coding device comprising:

an image splitting circuit configured to split an image into a plurality of block images each having plural pixels;

a Discrete Cosine Transform (DCT) circuit to configured to perform a DCT processing on the block image to calculate DCT coefficients from the block image;

a quantizing circuit configured to quantize the calculated DCT coefficients with respective quantization step sizes specified;

a distortion determining circuit configured to determine whether the block image is in a flat state or non-flat state depending on the calculated DCT coefficients from the block image; and a step size determination circuit to configured to specify as quantization step sizes for first DCT coefficients which are DCT coefficients equivalent to one-dimensional DCT coefficient out of the calculated DCT coefficients, adjusting step sizes equal to or smaller than values of the first DCT coefficients for the quantizing circuit, and specifying standard step sizes given beforehand as quantization step sizes for second DCT coefficients other than the first DCT coefficients out of the calculated DCT coefficients for the quantizing circuit, when the block image is in the flat state.

According to an aspect of the present invention, there is provided with an image coding method comprising:

splitting an image into a plurality of block images each having plural pixels;

performing a Discrete Cosine Transform (DCT) processing on the block image to calculate DCT coefficients from the block image;

determining whether the block image is in a flat state or non-flat state depending on the calculated DCT coefficients from the block image;

specifying as quantization step sizes for first DCT coefficients which are DCT coefficients equivalent to one-dimensional DCT coefficient out of the calculated DCT coefficients, adjusting step sizes equal to or smaller than values of the first DCT coefficients and as quantization step sizes for second DCT coefficients other than the first DCT coefficients out of the calculated DCT coefficients, standard step sizes given beforehand, when the block image is in the flat state; and quantizing the calculated DCT coefficients with respective quantization step sizes specified.

According to an aspect of the present invention, there is provided with a program to be executed by a computer, comprising:

a program module which splits an image into a plurality of block images each having plural pixels;

a program module which performs a Discrete Cosine Transform (DCT) processing on the block image to calculate DCT coefficients from the block image;

a program module which determines whether the block image is in a flat state or non-flat state depending on the DCT coefficients calculated from the block image;

a program module which specifies as quantization step sizes for first DCT coefficients which are DCT coefficients equivalent to one-dimensional DCT coefficient out of the calculated DCT coefficients, adjusting step sizes equal to or smaller than values of the first DCT coefficients and as quantization step sizes for second DCT coefficients other than the first DCT coefficients out of the calculated DCT coefficients, standard step sizes given beforehand, when the block image is in the flat state; and a program module which quantizes the calculated DCT coefficients with respective quantization step sizes specified.

DETAILED DESCRIPTION OF THE INVENTION

Hereinafter, the embodiments of the present invention will be described with reference to the drawings.

Figure 1:
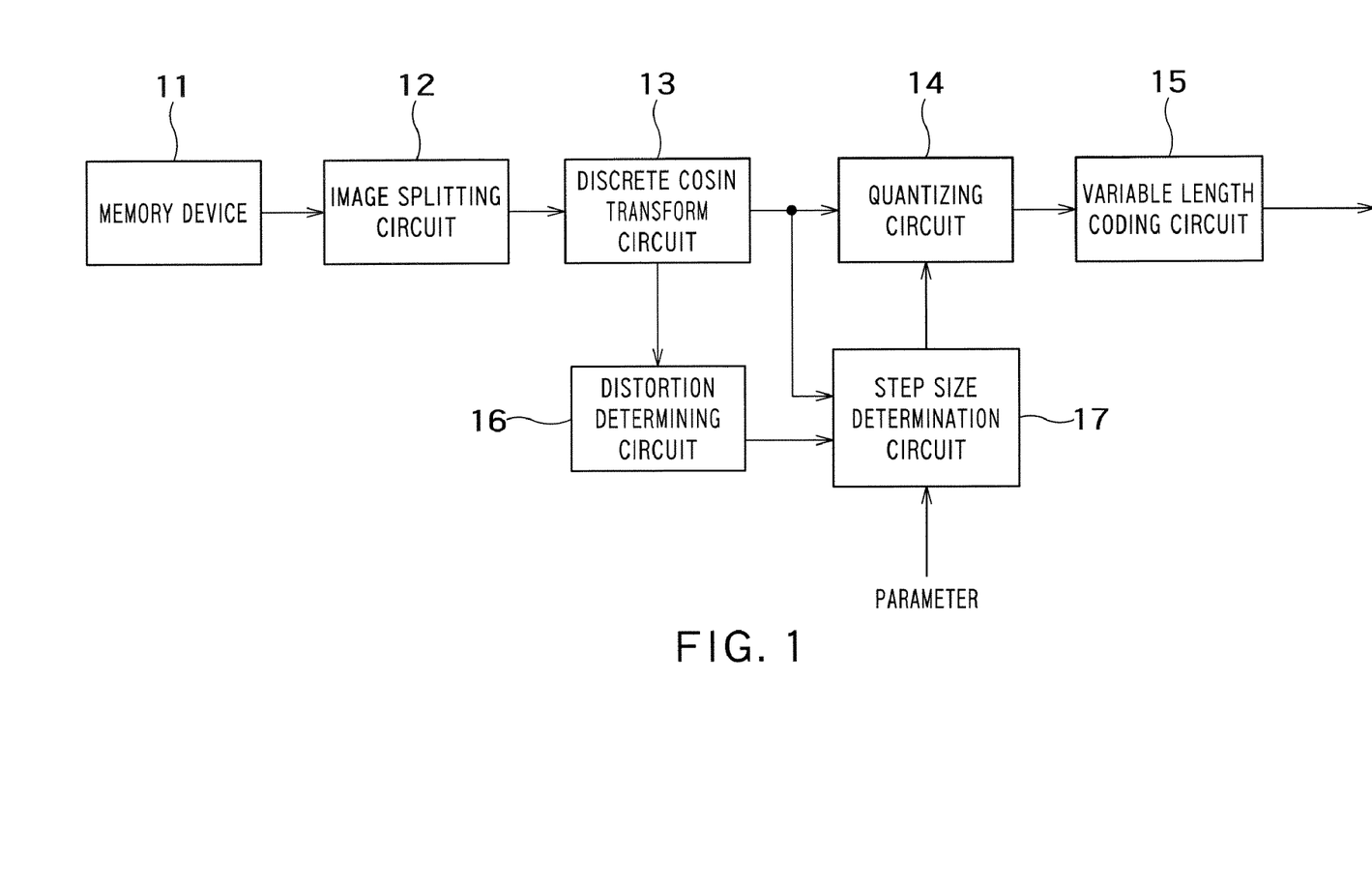
FIG. 1 is a block diagram illustrating a configuration of an image coding device according to a first embodiment.
Figure 2:
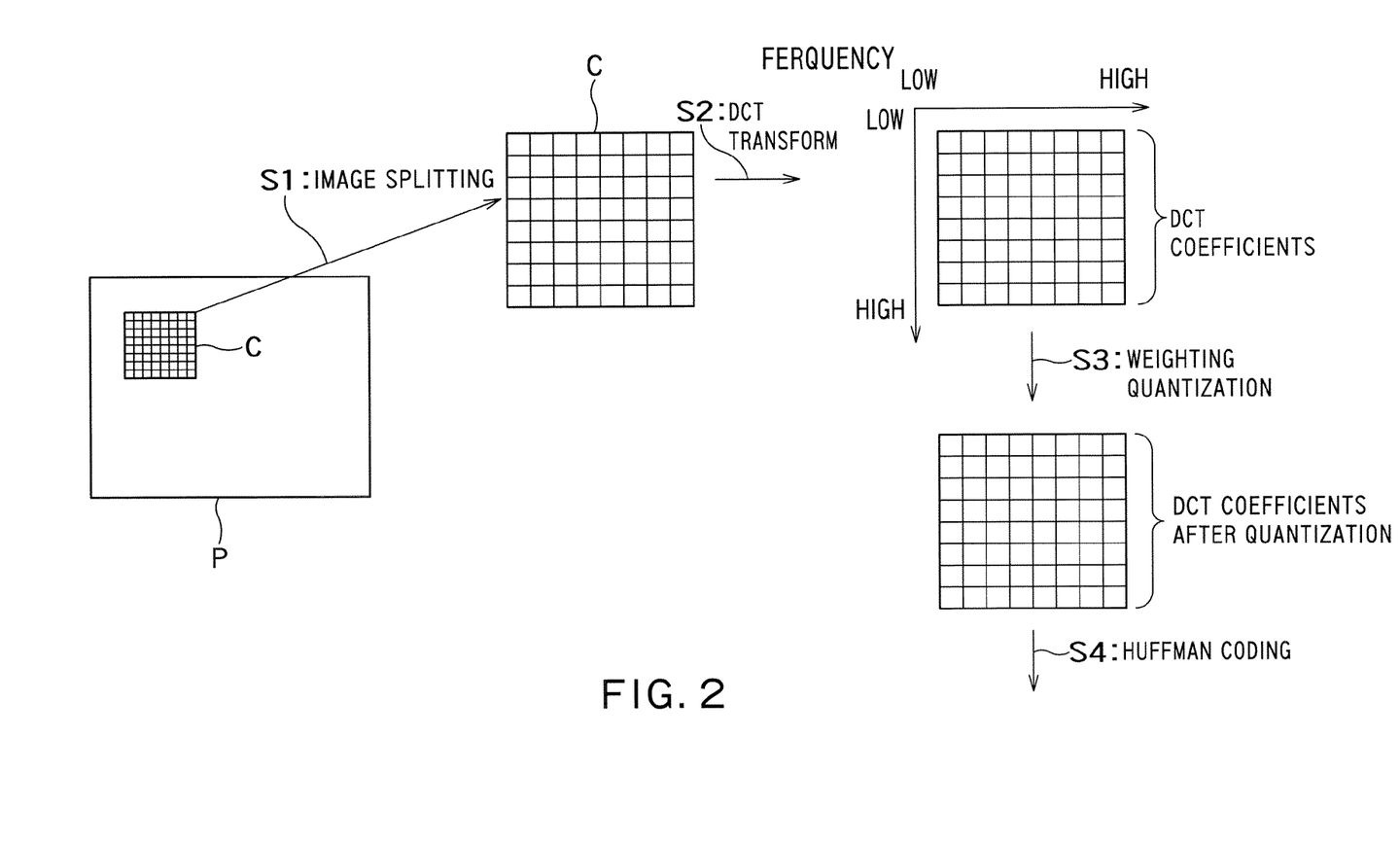
FIG. 2 is a schematic diagram showing an encoding process in the MPEG scheme.

FIG. 1 is a block diagram illustrating a configuration of an image coding device according to a first embodiment of the present invention. FIG. 2 is a diagram schematically illustrating processing by the image coding device of FIG. 1.

In FIG. 1, a memory device 11 receives and accumulates an original image P.

An image splitting circuit 12 reads the original image P from the memory device 11 and splits (blocks) the read original image P into a plurality of block images (S1). Each block image has n×n pixels. In this example, each block image has 8×8 pixels.

A Discrete Cosine Transform circuit (DCT) 13 receives each block image from the image splitting circuit 12 (in the example of FIG. 2, receives a block image C consisting of 8×8 (=64) pixels) and performs the Discrete Cosine Transform (DCT) on the block image C (S2). The Discrete Cosine Transform circuit 13 sends DCT coefficients (64 coefficients in this example) generated as a result of the Discrete Cosine Transform to a quantizing circuit 14, a distortion determining circuit 16 and a step size determination circuit (quantization parameter generating circuit) 17.

The distortion determining circuit 16 determines whether remarkable block distortion occurs at boundaries between the block image C and its adjacent block images based on the DCT coefficients input from the Discrete Cosine Transform circuit 13. In other words, the distortion determining circuit 16 determines whether the block image C is a flat image in which block distortion is remarkable or a non-flat image in which block distortion is not remarkable (discreet). The distortion determining circuit 16 sends the determination result to the step size determination circuit 17.

The step size determination circuit 17 calculates each quantization step size to quantize each DCT coefficient depending on the determination result from the distortion determining circuit 16, the DCT coefficients from the Discrete Cosine Transform circuit 13 and parameters input from the outside and sends the quantization step sizes calculated to the quantizing circuit 14.

The quantizing circuit 14 quantizes each DCT coefficient input from the Discrete Cosine Transform circuit 13 with each quantization step size input from the step size determination circuit 17 (S3) and sends each quantized DCT coefficient to a variable length coding circuit 15.

The variable length coding circuit 15 performs a variable length coding on each quantized DCT coefficient input from the quantizing circuit 14 (S4) and outputs the result. An example of the variable length coding may be the Huffman coding.

The distortion determining circuit 16 and the step size determination circuit 17 will be described in further detail.

First, the cause of the occurrence of the block distortion will be described.

Figure 3:
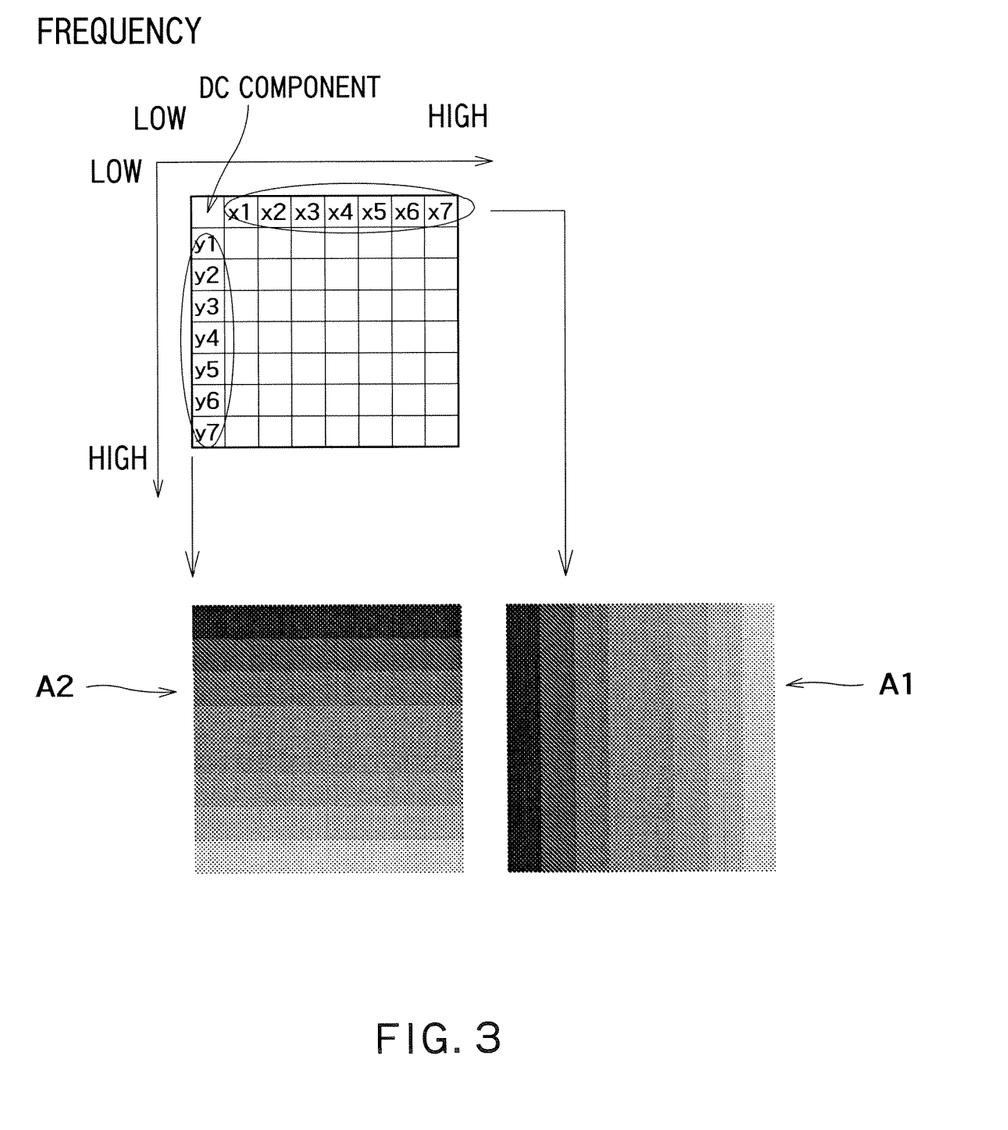
FIG. 3 illustrates a cause of occurrence of block distortion.

FIG. 3 illustrates the cause of occurrence of block distortion.

As one cause of the remarkable block distortion, DCT coefficients greatly related to the block distortion in a plurality of (64 in FIG. 3) DCT coefficients exist. Concretely, these coefficients are coefficients x1, x2, . . . , x7 equivalent to one-dimensional x direction DCT coefficient and coefficients y1, y2, . . . , y7 equivalent to one-dimensional y direction DCT coefficient. These coefficients correspond to first DCT coefficients.

An image in which block distortion is remarkable is typically a flat image. When performing the DCT processing on this flat image, due to the small values of the above DCT coefficients related to the block distortion (the coefficients equivalent to the one-dimensional x direction DCT coefficient and the coefficients equivalent to the one-dimensional y direction DCT coefficient), some of these DCT coefficients become zero by the weighting quantization, making the block distortion remarkable in many cases. Consequently, in the flat image, if a quantization is performed such that these DCT coefficients are not zero, compression can be made with the block distortion decreased (the block distortion made unremarkable).

In the above case, since the DCT coefficients x1, x2, ..., x7 are equivalent to the one-dimensional X direction DCT coefficient, if the inverse DCT is performed on these DCT coefficients, a decompressed image is, for example as shown by a reference number A1, an image with vertical boundary lines. Similarly, if the inverse DCT is performed on the DCT coefficients y1, y2, ..., y7, a decompressed image is, for example as shown by a reference number A2, an image with horizontal boundary lines. That is, if all or some of these coefficients x1, x2, ..., x7 and y1, y2, ..., y7 are zero, the straight boundary lines further outstand (in other words, some of the boundary lines in the image as shown by the reference number A1 and A2 disappear), resulting visibly remarkable distortion (for example, luminance to be gradually changed would change drastically).

Figure 5:
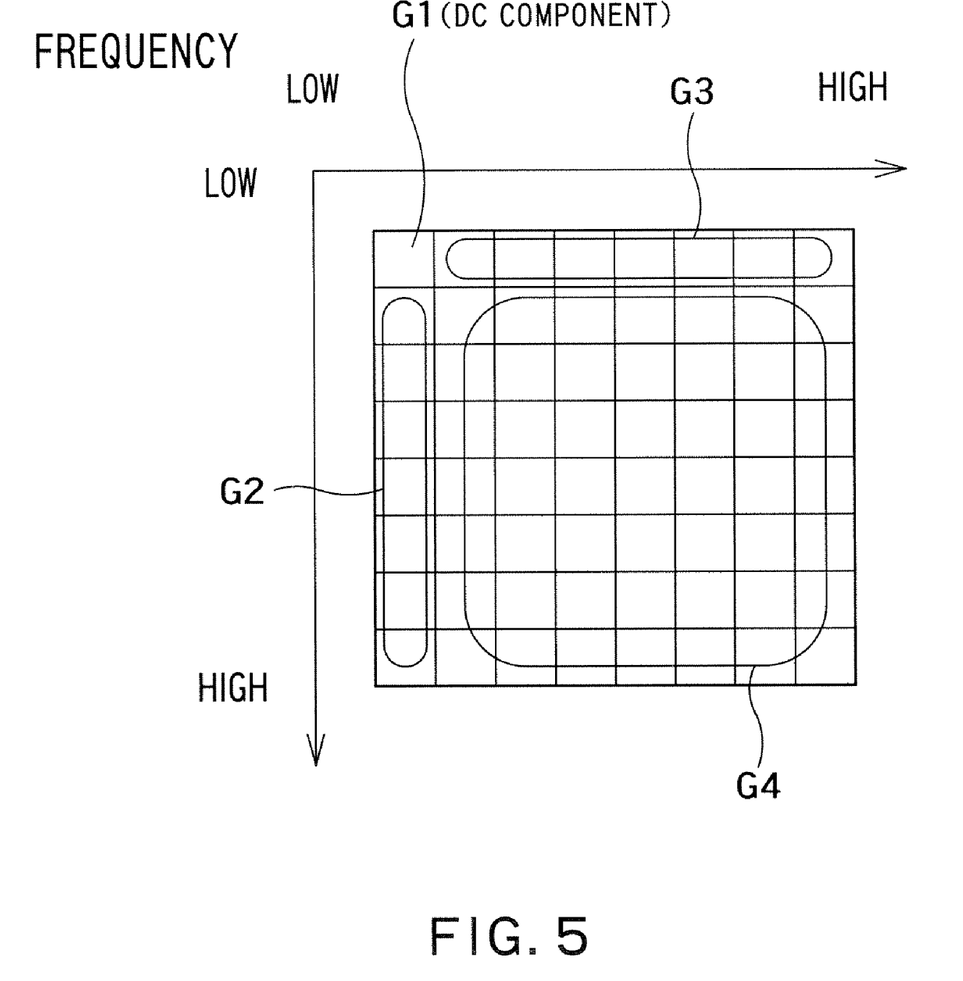
FIG. 5 is a diagram illustrating a state in which DCT coefficients are classified into four groups G1, G2, G3 and G4.

FIG. 5 is a diagram illustrating processing by the distortion determining circuit 16.

The distortion determining circuit 16 classifies the DCT coefficients input from the Discrete Cosine Transform circuit 13 into a plurality of groups: four groups G1, G2, G3 and G4 in this example. The group G1 includes a DCT coefficient of direct current (DC) component. The group G2 includes DCT coefficients equivalent to the one-dimensional y direction DCT coefficient. The group G3 includes DCT coefficients equivalent to the one-dimensional x direction DCT coefficient. The group G4 includes two-dimensional DCT coefficients. That is, the group G2, G3 includes first DCT coefficients, and the group G1, G4 includes second DCT coefficients other than the first DCT coefficients.

A flat image has a characteristic that many of the DCT coefficients in the groups G2 and G3 are not zero, and many of the DCT coefficients in the group G4 are zero or small values. By using this characteristic in a frequency domain, it can be easily determined whether or not a block image is a flat image in which block distortion is remarkable (whether in a flat state or non-flat state). A specific example of the determination is described below.

In the group G4, the number of DCT coefficients having values equal to or smaller than a threshold (pre-determined value) is counted, and determination is made whether or not the counting result is equal to or larger than a threshold a (first determination).

In the group G2, the number of nonzero DCT coefficients is counted, and determination is made whether or not the counting result is equal to or larger than a threshold $\beta 1$ (second determination).

In the group G3, the number of nonzero DCT coefficients is counted, determination is made whether or not the counting result is equal to or larger than a threshold $\beta 2$ (third determination).

If the result of the first determination is TRUE (the number of DCT coefficients having values equal to or smaller than the pre-determined value is equal to or larger than the threshold $\alpha$), the result of the second determination is TRUE (the counting result is equal to or larger than $\beta 1$), and the result of the third determination is TRUE (the counting result is equal to or larger than $\beta 2$), then it is determined that the above block image is a flat image in which block distortion is remarkable (having distortion). Otherwise, it is determined that the above block image is an image in which block distortion is unremarkable (having no distortion).

If the distortion determining circuit 16 determines that there is no distortion (the block image is non-flat image), the step size determination circuit 17 adopts values (standard step sizes) specified as a first parameter from the outside, as quantization step sizes to be applied for respective DCT coefficients included in the groups G1 to G4. The first parameter includes standard step sizes for respective DCT coefficients.

On the other hand, if the distortion determining circuit 16 determines that there is distortion (the block image is flat image), the step size determination circuit 17 decides quantization step sizes to be applied for respective DCT coefficients included in the groups G2 and G3 as adjusting step sizes, based on standard step sizes for respective DCT coefficients included in the groups G2 and G3, a compression rate specified as a second parameter from the outside (for example, a user), and respective DCT coefficients included in the groups G2 and G3. As quantization step sizes for respective DCT coefficients included in the groups G1 and G4, the standard step sizes for respective DCT coefficients is adopted. In the following, it is described in detail how to decide the quantization step sizes for respective DCT coefficients included in the groups G2 and G3.

First, at least DCT coefficients to be retained (DCT coefficients not to be lost in the quantization) of the DCT coefficients included in each of the groups G2 and G3 in FIG. 5 are selected based on the above second parameter (a compression rate). For example, if the above compression rate is high, three DCT coefficients are selected from each of the groups G2 and G3 (for example, x1, x2, x3 and y1, y2, y3 are to be retained), and if the rate is low, five DCT coefficients are selected from each of the groups G2 and G3 (for example, x1, x2, x3, x4, x5 and y1, y2, y3, y4, y5).

Next, quantization step sizes are calculated for respective DCT coefficient selected such that all DCT coefficients selected does not become zero, that is, the DCT coefficients selected have values other than zero even after the quantization is performed in the quantizing circuit 14. In other words, the same values as the DCT coefficients selected or values smaller than the above same values are determined as quantization step sizes for respective DCT coefficients selected. For example, the DCT coefficient selected and the above standard step size for this DCT coefficient are compared, and if the standard step size is smaller than the DCT coefficient, the standard step size is adopted as the quantization step size (when image quality is important; otherwise, the DCT coefficient value itself may be determined as the quantization step size). On the other hand, If the standard step size is equal to and larger than the DCT coefficient, the DCT coefficient value itself is determined as the quantization step size (that is, in this case, the DCT coefficient divided by the quantization step size equals one). Of course, if a value larger than the DCT coefficient is adopted as the quantization step size, the DCT coefficient may be lost (become zero) in the quantization. For the DCT coefficients not selected from among the DCT coefficients included in the groups G2 and G3, the standard step sizes for respective DCT coefficients are adopted as the quantization step sizes. In this way, maximum quantization step sizes to reduce the block distortion as much as possible can be easily found.

Figure 4:
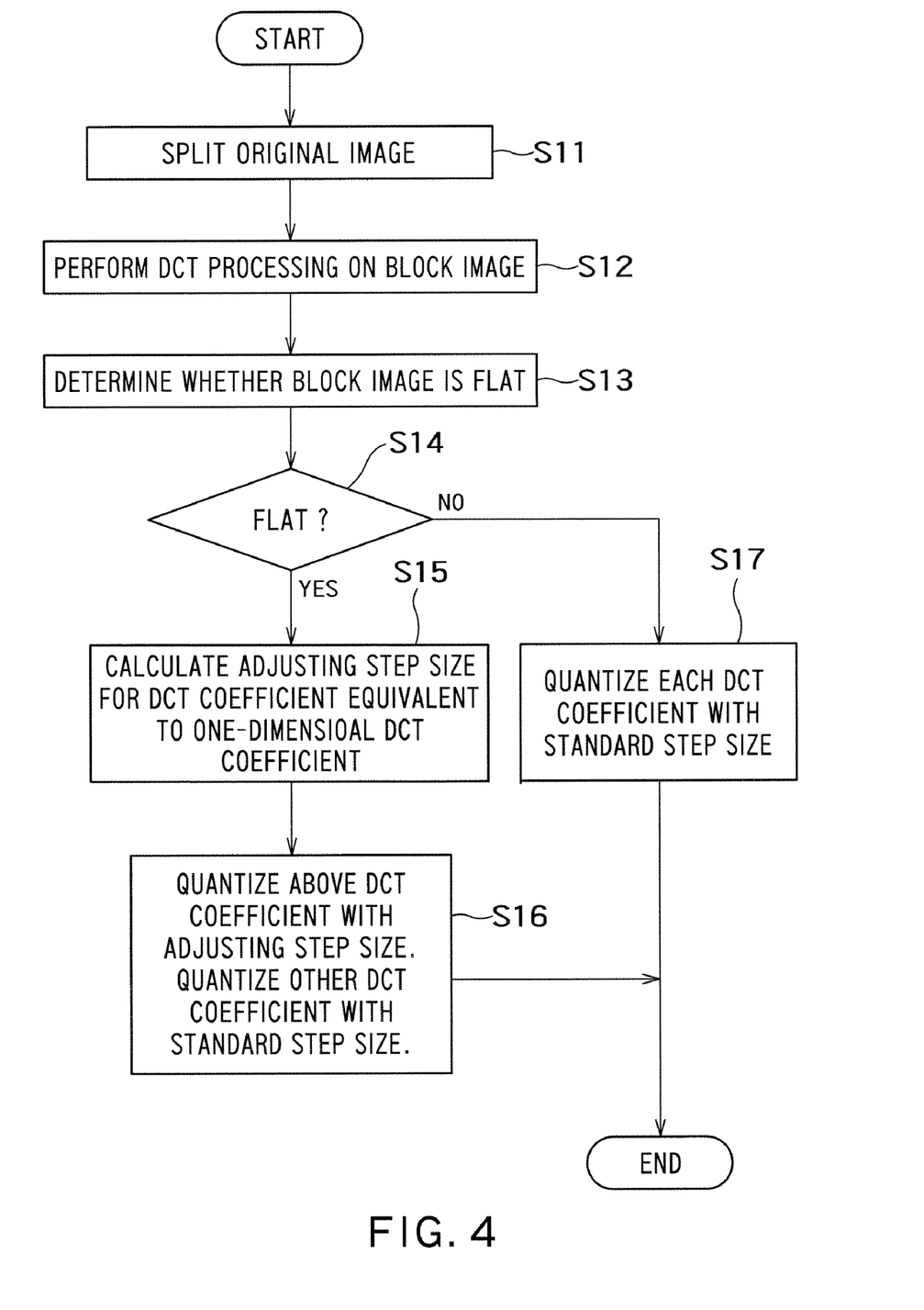
FIG. 4 is a flowchart for illustrating in detail the processing flow by the image coding device of FIG. 1.

FIG. 4 is a flowchart illustrating the processing flow by the image coding device of FIG. 1.

The image splitting circuit 12 reads the original image from the memory device 11 and splits the read original image into a plurality of blocks (S11).

The Discrete Cosine Transform circuit 13 performs the DCT processing on each block image to obtain DCT coefficients from each block image (S12).

The distortion determining circuit 16 determines whether each block image is in a flat state or non-flat state based on the DCT coefficients obtained from each block image (S13).

If the block image is in the flat state (YES at S14), the step size determination circuit 17 specifies as quantization step sizes for DCT coefficients equivalent to one-dimensional DCT coefficient, values equal to or smaller than these DCT coefficients for the quantizing circuit 14 (S15). The circuit 17 also specifies as quantization step sizes for DCT coefficients other than the DCT coefficients equivalent to the one-dimensional DCT coefficient, standard step sizes for these DCT coefficients for the quantizing circuit 14 (S15).

The quantizing circuit 14 quantizes DCT coefficients calculated by the Discrete Cosine Transform circuit 13 using the quantization step size specified by the step size determination circuit 17 (S16).

At S14, if the block image is in the non-flat state (NO at S14), standard step sizes are specified as quantization step sizes for all DCT coefficients. The quantizing circuit 14 quantizes the DCT coefficients calculated by the Discrete Cosine Transform circuit 13 by using the quantization step sizes determined by the step size determination circuit 17 (S17).

By having a computer execute a computer program describing instruction codes (program modules) to execute each step shown in above flow chart, processing of each step can be accomplished. The computer program may be stored in computer-readable recording media.

As described above, according to this embodiment, it is possible to easily find out the flat block images in which block distortion is remarkable with not modifying other block images falsely. In addition, it is possible to easily find the maximum quantization step size to reduce the block distortion as much as possible, and as a result, it is possible to improve the compression rate, while maintaining image quality as much as possible.

Figure 6:
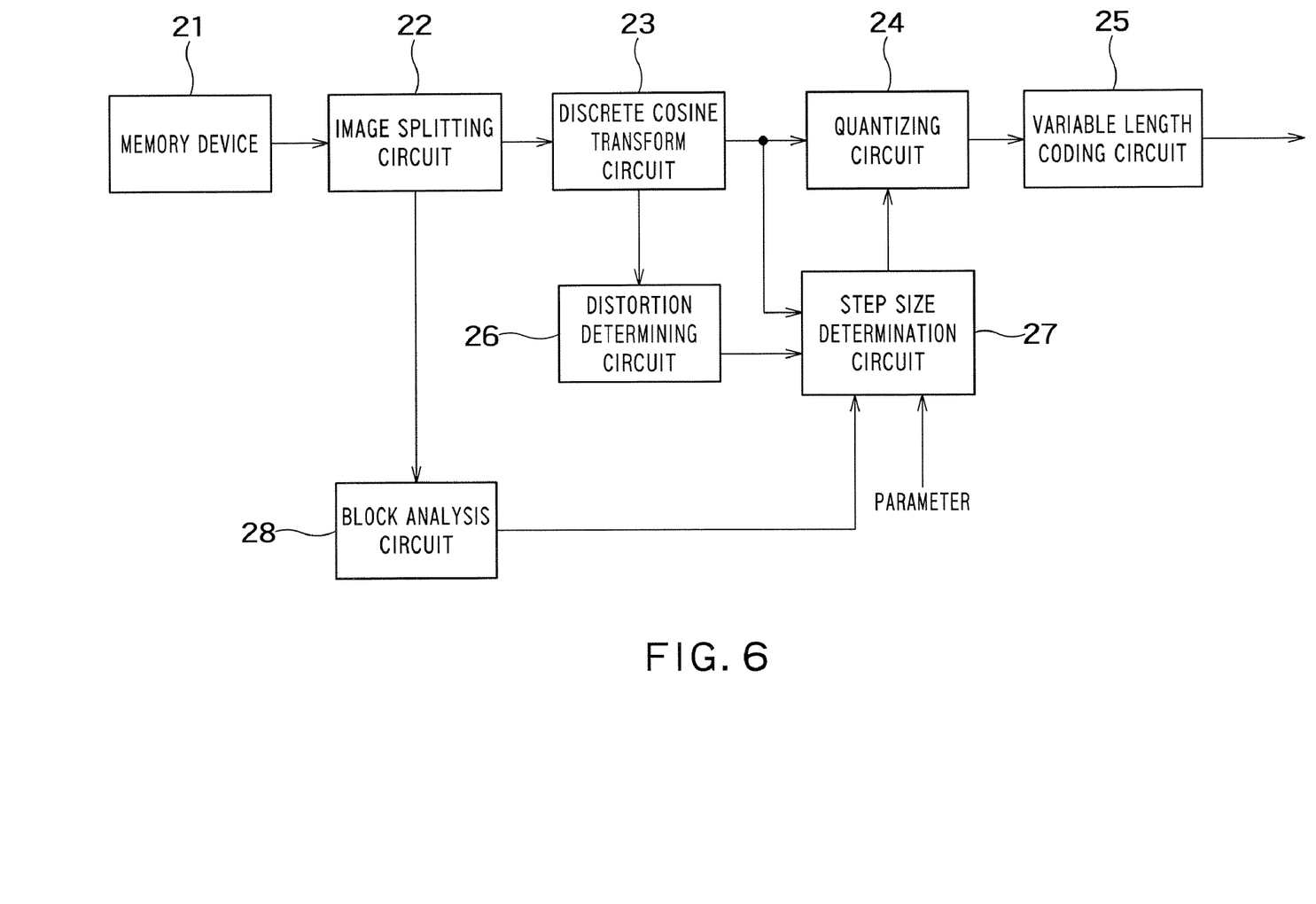
FIG. 6 is a block diagram illustrating a configuration of an image coding device according to a second embodiment.

FIG. 6 is a block diagram illustrating a configuration of an image coding device according to a second embodiment of the present invention.

A memory device 21 receives and accumulates an original image.

An image splitting circuit 22 reads the original image from the memory device 21 and spits the read original image into a plurality of block images. The image splitting circuit 22 sends each block image to a Discrete Cosine Transform circuit 23 and a block analysis circuit 28.

The Discrete Cosine Transform circuit 23 performs the Discrete Cosine Transform on each block image and sends DCT coefficients calculated from each block image to a quantizing circuit 24, a distortion determining circuit 26 and a step size determination circuit(quantization parameter generating circuit) 27.

The distortion determining circuit 26 determines whether or not the remarkable block distortion occurs at the block boundary based on the DCT coefficients received from the Discrete Cosine Transform circuit 23 per block image, in the same way as the first embodiment, and sends the determination result for each block image to the step size determination circuit 27.

A block analysis circuit 28 analyzes each block image received from the image splitting circuit 22 and analyzes pixel distribution in each block image. More specifically, the block analysis circuit 28 analyzes the received each block image, and for each of two-dimensional directions (x direction and y direction), determines whether the pixel distribution in the block image can be more properly expressed by which of an odd function and an even function. A pixel distribution pattern which can be more properly expressed by the odd function is termed an odd-functional distribution pattern (a first pixel distribution pattern), and a pixel distribution pattern which can be more properly expressed by the even function is termed an even-functional distribution pattern (a second pixel distribution pattern). That is, the block analysis circuit 28 analyzes whether the block image have which of the odd-functional distribution pattern and even-functional distribution pattern. The block analysis circuit 28 sends the analysis result to the step size determination circuit 27.

Figure 9:
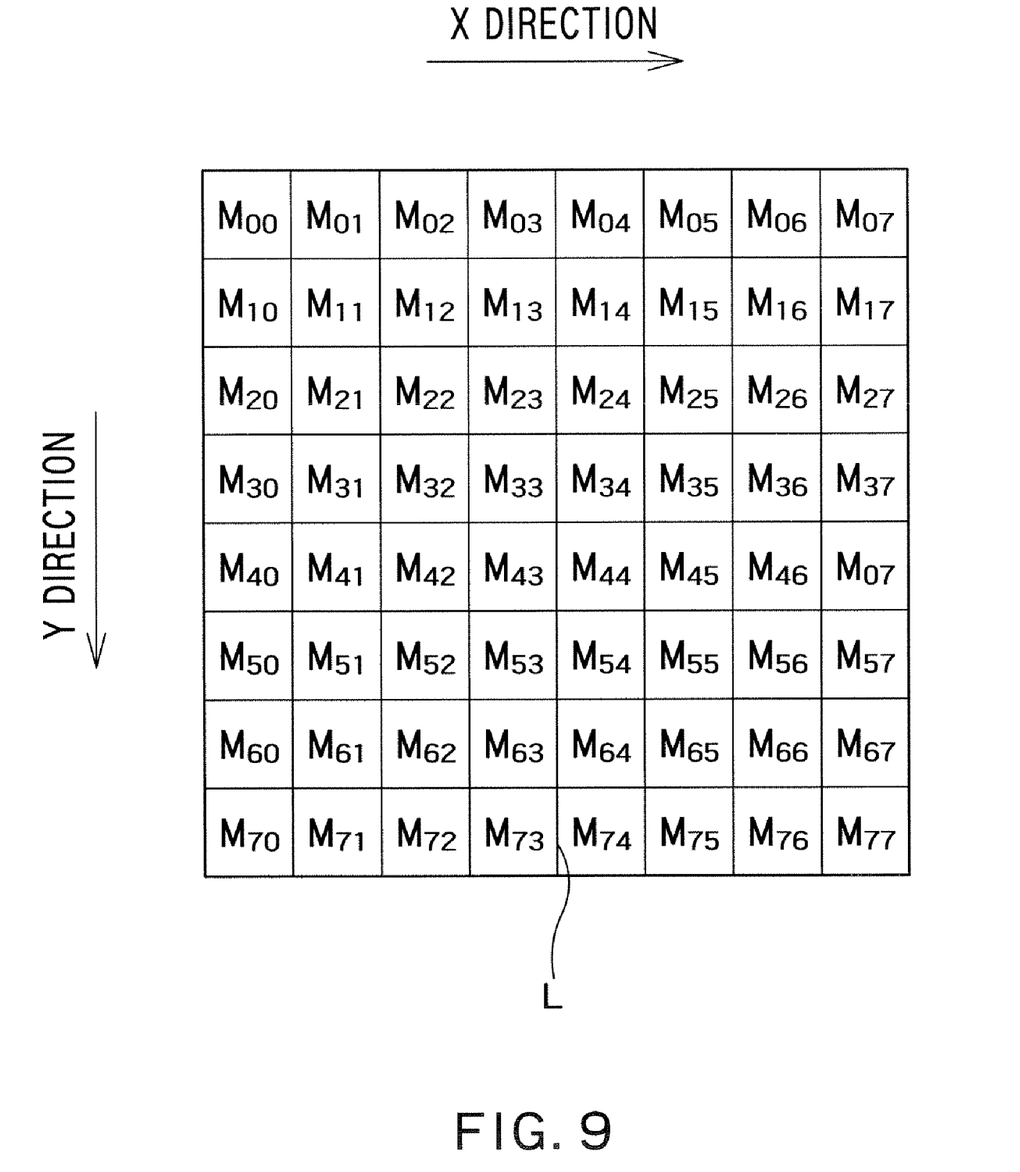
FIG. 9 is a diagram illustrating a specific example of an analysis by a block analysis circuit.

FIG. 9 is a diagram illustrating a specific example of an analysis by the block analysis circuit 28.

One example of the block images is shown in FIG. 9. Pixels of the block image include pixel values M00 to M77. In this example, it is analyzed whether a y direction of the block image has either an odd-functional distribution pattern or an even-functional distribution pattern. The same analysis is done for the x direction. Considering the center line L for splitting the block image into two parts in the x direction, first,
|M00-M07|+|M01-M06|+|M02-M05|+|M03-M04|
(=SUMO) is calculated for a zeroth row. In the same way,
|M10-M17|+|M11-M16|+|M12-M15|+|M13-M14|
(=SUM1) is calculated for a first row. Furthermore, the same calculation is done for second to seventh rows to find SUM2 to SUM7. Then, SUM0+SUM1+SUM2+SUM3+SUM4+ SUMS+SUM6+SUM7 (=TOTAL) is calculated. If the TOTAL is larger than a threshold, it is determined that this block image has the odd-functional distribution pattern in the y direction, otherwise, it is determined that this block image has the even-functional distribution pattern in the y direction. The odd-functional distribution pattern can be said to be distribution wherein the luminance gradually changes in one-dimensional way (here, along the y direction) (luminance of the upper edge and that of the lower edge of the block image are different) (see the left side of FIG. 8 below), and the even-functional distribution pattern can be said to be distribution wherein the luminance rises or declines in one-dimensional direction (here, along the y direction) to some point (center point), but from that point it declines or rises (the luminance of the upper edge and that of the lower edge of the block image are similar) (see the right side of FIG. 8 below). The block image of the odd-functional distribution pattern can be more properly expressed by odd functions with its origin at the center of the block image, and the block image of the even-functional distribution pattern can be more properly expressed by even functions with its origin at the center of the block image.

If the distortion determining circuit 26 determines that the block image has no distortion, the step size determination circuit 27 adopts, similarly to the first embodiment, standard step sizes shown by the first parameter input from the outside as the quantization step sizes of respective DCT coefficients included in the groups G1 to G4.

If the distortion determining circuit 26 determines that the block image has the distortion, the step size determination circuit 27 calculates the quantization step sizes of DCT coefficients included in the groups G2 and G3 depending on these DCT coefficient, the standard step sizes for these DCT coefficients shown by the first parameter, and the analysis result by the block analysis circuit 28. As the quantization step sizes of DCT coefficients included in the groups G1 and G4, the step size determination circuit 27 adopts the standard step sizes for these DCT coefficients shown by the first parameter.

More specifically, for the decision of the quantization step sizes of DCT coefficients included in the groups G2 and G3, in the first embodiment, DCT coefficients to be selected (not to be lost in the quantization) are decided with the priority of x1, x2, x3 ... or y1, y2, y3 ..., according to the above second parameter (compression rate). On the contrary, in this embodiment, they are decided according to the analysis result of the block analysis circuit 28. Incidentally, the second parameter (compression rate) can be input to the step size determination circuit 27 from the outside to use both this second parameter and the analysis result of the above block analysis circuit 28 to decide DCT coefficients to be selected.

The quantizing circuit 24 quantizes DCT coefficients received from the Discrete Cosine Transform circuit 23 with respective quantization step sizes received from the step size determination circuit 27 and sends quantized DCT coefficients to a variable length coding circuit 25. The variable length coding circuit 25 performs variable length coding on these quantized DCT coefficients and outputs the result.

The step size determination circuit 27 is further described in detail below.

Figure 7:
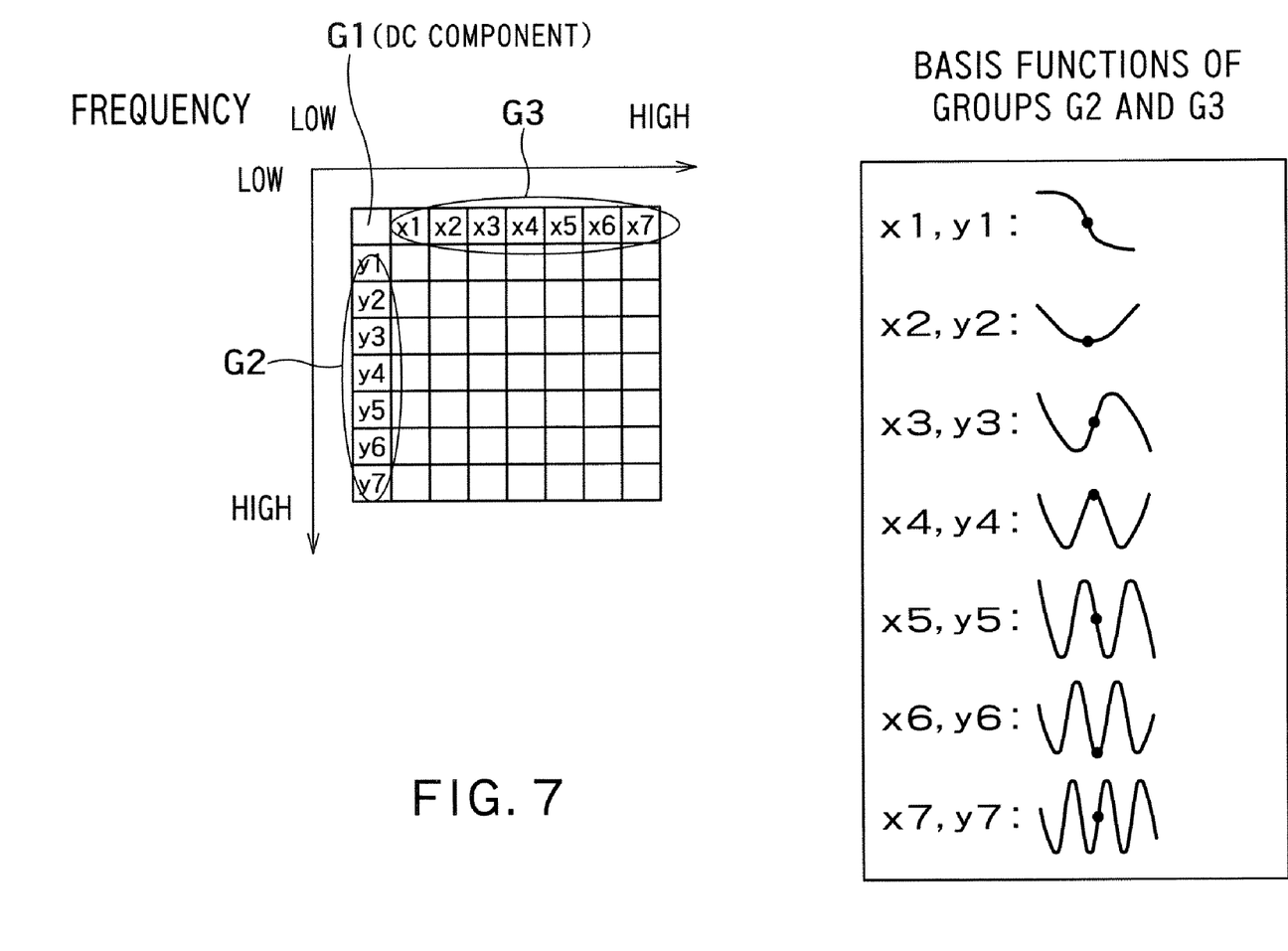
FIG. 7 is a diagram illustrating basis functions of the Discrete Cosine Transform.

FIG. 7 illustrates basis functions corresponding to DCT coefficients included in the groups G2 and G3.

Figure 8:
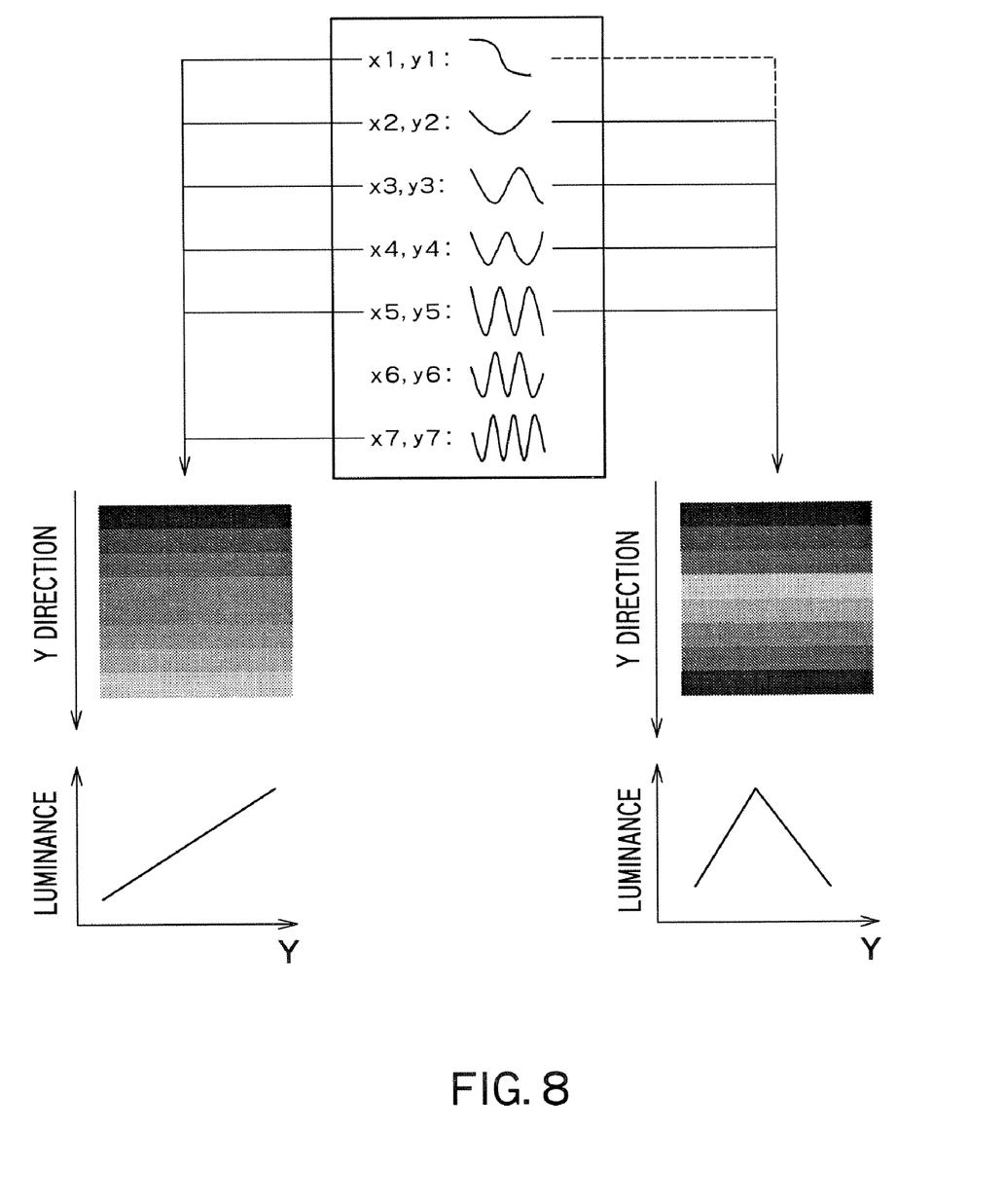
FIG. 8 is a diagram illustrating a method for selecting basis functions according to the second embodiment.

With the block center being the origin, basis functions of DCT coefficients with odd position numbers (x1, x3, x5, x7, y1, y3, y5 and y7) is an odd function. On the contrary, with the block center being the origin, basis functions of DCT coefficients with even position numbers (x2, x4, x6, y2, y4 and y6) is an even function. By utilizing this, as shown in FIG. 8 which illustrates a selecting method of basis functions, characteristics of the block image can be expressed with fewer basis functions, depending on the pixel distribution pattern of the block image.

That is, as a result of the analysis by the block analysis circuit 28, if the block image has the even-functional distribution pattern, DCT coefficients are decided to be selected whose basis function is an even function. For example, if the block image has an even-functional distribution pattern in the x direction, DCT coefficients x2, x4 and x6 are decide to be selected (if, for example four or more DCT coefficients are selected according to the second parameter, then the coefficients x1, x3 and x5 are to be selected in this priority, in addition to x2, x4 and x6). Similarly, if the block image has the even-functional distribution pattern in the y direction, DCT coefficients y2, y4 and y6 are decided to be selected (if, for example, four or more DCT coefficients are selected according to the second parameter, then the coefficients y1, y3 and y5 are to be selected in this priority, in addition to y2, y4 and y6). Since experience shows that high-resolution image can be decoded if the DCT coefficients x1 and y1 are not lost in the quantization, the DCT coefficients x1 and y1 can be decided to be unconditionally selected (see a dotted line in FIG. 8). In other words, a "01" coefficient and a "10" coefficient can be decided to be unconditionally selected. The "01" coefficient and "10" coefficient are described briefly below.

Typically, the two-dimensional inverse DCT can be expressed as follows:

$$f(x, y) = 2/N * C(u) * C(v) *$$

$$\sum_{x=0}^{N-1}\sum_{y=0}^{N-1} F(u, v) * \cos[(2x+1)u\pi/2N] * \cos[(2y+1)v\pi/2N]$$

$$u, v, x, y = 0, 1, 2 \ldots N - 1$$

$$C(u), C(v) = 1/\sqrt{2} \ (u, v = 0)$$

$$C(u), C(v) = 1 (u, v \neq 0)$$

The two-dimensional DCT coefficient F(u, v) where u=a, v=b is termed an "ab" coefficient. For example, the two-dimensional DCT coefficient F(u, v) where u=0, v=1 is termed a "01" (zero one) coefficient, and the two-dimensional DCT coefficient F(u, v) where u=1, v=0 is termed a "10" (one zero) coefficient. In this case, a basis function corresponding to x1 and y1 of FIG. 8 can be termed a basis function of the "01" coefficient and the "10" coefficient in the two-dimensional inverse DCT.

On the other hand, as a result of the analysis by the block analysis circuit 28, if the block image has the odd-functional distribution pattern, the DCT coefficients whose basis function is the odd function are decided to be selected. For example, if the block image has the odd-functional distribution pattern in the x direction, the DCT coefficients x1, x3 and x5 are decided to be selected. Also, if the block image has the odd-functional distribution pattern in the y direction, the DCT coefficients y1, y3 and y5 are decided to be selected.

For the DCT coefficients selected in this way, respective quantization step sizes are decided as in the first embodiment. For example, if the standard step size is smaller than the DCT coefficient, the standard step size is determined as the quantization step size. If the standard step size equals to or larger than the DCT coefficient, the DCT coefficient itself (or a value smaller than that) is determined as the quantization step size. For DCT coefficients other than that selected, respective standard step sizes are determined as the quantization step sizes.

As described above, according to this embodiment, optimum DCT coefficients can be selected by analyzing the block image, and thereby can improve the compression rate compared to the first embodiment while maintaining image quality.

What is claimed is:

1. An image coding device comprising:
    an image splitting circuit configured to split an image into a plurality of block images each having plural pixels;
    a Discrete Cosine Transform (DCT) circuit to configured to perform a DCT processing on the block image to calculate DCT coefficients from the block image;
    a quantizing circuit configured to quantize the calculated DCT coefficients with respective quantization step sizes specified;
    a distortion determining circuit configured to determine whether the block image is in a flat state or non-flat state depending on the calculated DCT coefficients from the block image; and
    a step size determination circuit to configured to specify as quantization step sizes for first DCT coefficients which are DCT coefficients equivalent to one-dimensional DCT coefficient out of the calculated DCT coefficients, adjusting step sizes equal to or smaller than values of the first DCT coefficients for the quantizing circuit, and specifying standard step sizes given beforehand as quantization step sizes for second DCT coefficients other than the first DCT coefficients out of the calculated DCT coefficients for the quantizing circuit, when the block image is in the flat state.

2. The device according to claim 1 wherein the distortion determining circuit
    counts a first number of the first DCT coefficients which are not zero and a second number of two-dimensional DCT coefficients having pre-determined value or less out of two-dimensional DCT coefficients included in the second DCT coefficients, and
    determines that the block image is in the flat state if the first number is a first threshold or more and the second number is a second threshold or more.

3. The device according to claim 2 wherein the distortion determining circuit counts a third number of first DCT coefficients which are not zero in a y direction and a fourth number of first DCT coefficients which are not zero in a x direction perpendicular to the y direction, as the first number, and determines that the block image is in the flat state, if the third number is a third threshold or more, the fourth number is a fourth threshold or more, and the second number is the second threshold or more.

4. The device according to claim 1, wherein the step size determination circuit selects DCT coefficients of a number depending on a compression rate specified beforehand among from the first DCT coefficients, specifies for the selected DCT coefficients the adjusting step sizes, and specifies standard step sizes given beforehand for the DCT coefficients other than the selected DCT coefficients out of the first DCT coefficients.

5. The device according to claim 1 wherein if the standard step size given beforehand for the first DCT coefficient is smaller than value of the first DCT coefficient, the step size determination circuit specifies the standard step size as the adjusting step size of the first DCT coefficient for the quantizing circuit.

6. The device according to claim 1 further comprising a variable length coding circuit configured to perform variable length coding on the DCT coefficients quantized by the quantizing circuit.

7. The device according to claim 1 further comprising a block analysis circuit configured to analyze which of an odd-functional distribution pattern or an even-functional distribution pattern the block image has in each of a mutually-perpendicular x direction and y direction, wherein the step size determination circuit:

if the block image has the odd-functional distribution pattern in the x or y direction, specifies the adjusting step sizes for DCT coefficients associated with basis functions of an odd function out of the first DCT coefficients in the x or y direction, and specifies standard step sizes given beforehand for DCT coefficients associated with basis functions of an even function out of the first DCT coefficients in the x or y direction; and if the block image has the even-functional distribution pattern in the x or y direction, specifies the adjusting step sizes for DCT coefficients associated with the basis functions of the even function out of the first DCT coefficients in the x or y direction, and specifies standard step sizes given beforehand for DCT coefficients associated with the basis functions of the odd function out of the first DCT coefficients in the x or y direction.

8. The device according to claim 7 wherein the block analysis circuit analyzes which of the odd-functional distribution pattern or the even-functional distribution pattern the block image has in each of the x direction and y direction, by computation using values of respective pixels in the block image.

9. The device according to claim 7 wherein if the block image has the even-functional pattern in the x or y direction, the step size determination circuit specifies the adjusting step size for a "01" or "10" coefficient out of the DCT coefficients associated with the basis functions of the odd function in the x or y direction.

10. An image coding method comprising:

splitting an image into a plurality of block images each having plural pixels;

performing a Discrete Cosine Transform (DCT) processing on the block image to calculate DCT coefficients from the block image;

determining whether the block image is in a flat state or non-flat state depending on the calculated DCT coefficients from the block image;

specifying as quantization step sizes for first DCT coefficients which are DCT coefficients equivalent to one-dimensional DCT coefficient out of the calculated DCT coefficients and adjusting step sizes equal to or smaller than values of the first DCT coefficients and as quantization step sizes for second DCT coefficients other than the first DCT coefficients out of the calculated DCT coefficients, standard step sizes given beforehand, when the block image is in the flat state; and quantizing the calculated DCT coefficients with respective quantization step sizes specified.

11. The method according to claim 10 wherein the determining includes counting a first number of the first DCT coefficients which are not zero and a second number of two-dimensional DCT coefficients having pre-determined value or less out of two-dimensional DCT coefficients included in the second DCT coefficients, and determining that the block image is in the flat state if the first number is a first threshold or more and the second number is a second threshold or more.

12. The method according to claim 11 wherein the counting includes counting a third number of first DCT coefficients which are not zero in a y direction and a fourth number of first DCT coefficients which are not zero in a x direction perpendicular to the y direction, as the first number, and the determining includes determining that the block image is in the flat state, if the third number is a third threshold or more, the fourth number is a fourth threshold or more, and the second number is the second threshold or more.

13. The method according to claim 10, further comprising inputting a compression rate, wherein the specifying includes selecting DCT coefficients of a number depending on the compression rate among from the first DCT coefficients, specifying for the selected DCT coefficients the adjusting step sizes, and specifying standard step sizes given beforehand for the DCT coefficients other than the selected DCT coefficients out of the first DCT coefficients.

14. The method according to claim 10 wherein if the standard step size given beforehand for the first DCT coefficient is smaller than value of this first DCT coefficient, the specifying includes specifying the standard step size as the adjusting step size of this first DCT coefficient.

15. The method according to claim 10 further comprising performing variable length coding on the DCT coefficients quantized.

16. The method according to claim 10 further comprising analyzing which of an odd-functional distribution pattern or an even-functional distribution pattern the block image has in each of a mutually-perpendicular x direction and y direction, wherein the specifying includes:

if the block image has the odd-functional distribution pattern in the x or y direction, specifying the adjusting step sizes for DCT coefficients associated with basis functions of an odd function out of the first DCT coefficients in the x or y direction, and specifying standard step sizes given beforehand for DCT coefficients associated with basis functions of an even function out of the first DCT coefficients in the x or y direction; and if the block image has the even-functional distribution pattern in the x or y direction, specifying the adjusting step sizes for DCT coefficients associated with the basis functions of the even function out of the first DCT coefficients in the x or y direction, and specifying standard step sizes given beforehand for DCT coefficients associated with the basis functions of the odd function out of the first DCT coefficients in the x or y direction.

17. The method according to claim 16 wherein the analyzing includes analyzing which of the odd-functional distribution pattern or the even-functional distribution pattern the block image has in each of the x direction and y direction, by computation using values of respective pixels in the block image.

18. The method according to claim 16 wherein if the block image has the even-functional pattern in the x or y direction, the specifying includes specifying the adjusting step size for a "01" or "10" coefficient out of the DCT coefficients associated with the basis functions of the odd function in the x or y direction.

19. A computer readable medium storing program instructions which when executed by a computer results in performance of steps comprising:

splitting an image into a plurality of block images each having plural pixels;

performing a Discrete Cosine Transform (DCT) processing on the block image to calculate DCT coefficients from the block image;

determining whether the block image is in a flat state or non-flat state depending on the calculated DCT coefficients from the block image;

specifying as quantization step sizes for first DCT coefficients which are DCT coefficients equivalent to one-dimensional DCT coefficient out of the calculated DCT coefficients and adjusting step sizes equal to or smaller than values of the first DCT coefficients and as quantization step sizes for second DCT coefficients other than the first DCT coefficients out of the calculated DCT coefficients, standard step sizes given beforehand, when the block image is in the flat state; and quantizing the calculated DCT coefficients with respective quantization step sizes specified.

* * * * *